No. 767,007. Patented August 9, 1904.

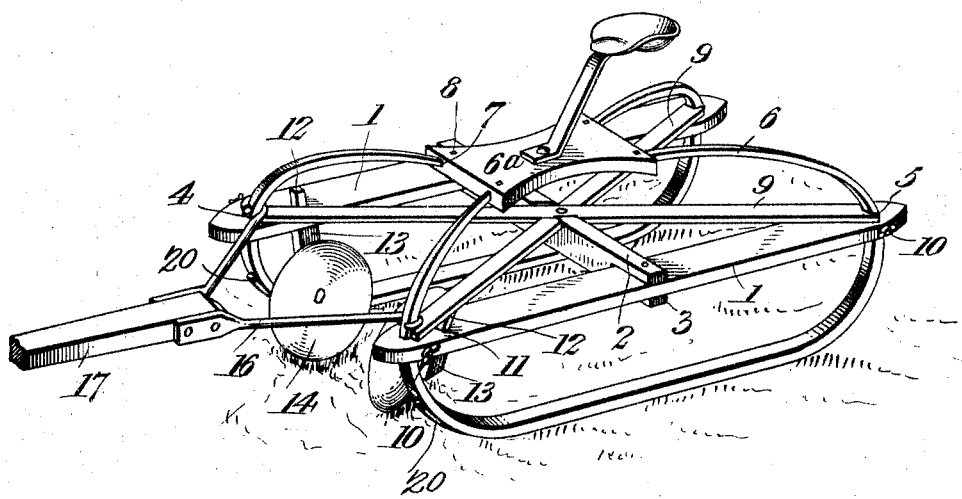

UNITED STATES PATENT OFFICE.

WILLIAM HENRY PAGE, OF SWEDESBORO, NEW JERSEY.

CULTIVATOR.

SPECIFICATION forming part of Letters Patent No. 767,007, dated August 9, 1904.

Application filed February 11, 1904. Serial No. 193,215. (No model.)

*To all whom it may concern:*

Be it known that I, WILLIAM HENRY PAGE, a citizen of the United States, residing at Swedesboro, in the county of Gloucester and State of New Jersey, have invented a new and useful Cultivator, of which the following is a specification.

This invention relates to cultivating implements; and it has for its object to provide a device of this class which shall be simple in construction and capable of being manufactured at a small expense and which shall at the same time be light, serviceable, and useful for a variety of purposes, such as for hilling sweet potatoes and other crops, for cultivating the ground, eradicating weeds, and the like.

With these and other ends in view, which will readily appear as the nature of my invention is better understood, the same consists in the improved construction, combination, and arrangement of parts, which will be hereinafter fully described, and particularly pointed out in the claims.

In the accompanying drawings, Figure 1 is a perspective view of a cultivating implement constructed in accordance with the principles of my invention. Fig. 2 is a front elevation. Fig. 3 is a top plan view.

Corresponding parts in the several figures are indicated by similar numerals of reference.

The frame of my improved cultivating implement is composed, essentially, of two side pieces 1 1 and a cross-piece 2, which latter is provided at the ends thereof with slots 3 for the reception of the said side pieces 1, which are spaced apart by said cross-piece. The side pieces 1 1 are provided near the front and rear ends thereof with vertical perforations 4 4.

5 5 designate a pair of runners, which may be constructed of wood or metal. These runners have upturned front and rear ends 6, which are extended through the perforations 4 in the side pieces 1 1, above which the front ends of said runners are bent rearwardly and the rear ends are bent forwardly, the extremities of said runners being suitably connected with a seat or seat-supporting plate 6$^a$. This connection may be formed in a variety of ways. In the drawings the ends of the runners have been shown as inserted into sockets 7 in the front and rear edges of the seat-plate 6$^a$, where they have been secured by means of keys 8; but I desire it to be understood that any other suitable and well-known means of attachment or connection between the parts may be used.

9 9 designates a pair of diagonal braces which cross or intersect each other and the ends of which abut against the upturned ends of the runners for the purpose of bracing and stiffening the structure. Suitable attaching or connecting means may be used at these points. At the points where the upturned ends of the runners pass through the perforations 4 in the side pieces 1 the latter may be provided with set-screws or other fastening means (shown at 10) for the purpose of effecting a connection; but I desire it to be distinctly understood that these devices may be dispensed with or modified in any desired way.

The side pieces 1 1 are provided with vertical perforations 11 for the passage of the shanks 12 of a pair of standards 13, which carry earth-engaging implements 14. In the accompanying drawings the earth-engaging implements have been illustrated as rotary disks; but here again I desire it to be understood that cultivating implements of any desired character may be substituted without departing from the spirit of my invention. It is also to be understood that any desired means may be employed for adjusting and retaining the said implements in any desired position for operation.

Draft may in practice be attached either to the front end of the side pieces 1 or directly to the runners. In the drawings I have shown a pair of hounds 16 connected with the runners and supporting a tongue 17.

From the foregoing description, taken in connection with the drawings hereto annexed, the operation and advantages of my invention will be readily understood by those skilled in the art to which it appertains. The construction is extremely simple, and an implement embodying my invention may be produced at an extremely moderate expense. At the same time it will be found to be light, easily operated, light of draft, and serviceable for all purposes for which a device of this class is generally employed.

It is obvious that the rotary earth-engaging implements may be easily changed for cultivator-blades of any desired construction and that by its peculiar construction my improved implement is particularly adapted to straddle the rows of growing crops.

When the runners of the device are made of wood, they may be shod with strips of iron, as shown in Figs. 1 and 2 of the drawings, where said strips have been designated 20 20.

Having thus described my invention, I claim—

1. In a device of the class described, a pair of side pieces having perforations near their front and rear ends, runners having upturned ends extending through said perforations, and connecting means for the ends of said runners.

2. In a device of the class described, a pair of side pieces having perforations near their front and rear ends, spacing means for said side pieces, a pair of runners having upturned ends extending through the perforations in the side pieces and bent in the direction of each other, and a seat-bar having sockets in which the ends of the runners are secured.

3. In a device of the class described, a frame comprising a pair of side pieces having perforations near their front and rear ends, a cross-piece spacing said side pieces apart, runners having upturned ends extending through the perforations in the side pieces, a bar having sockets in which the ends of the runners are secured, diagonal braces abutting upon said runners, shanks extending through perforations in the side pieces near the front ends of the latter, and earth-engaging implements carried by said shanks.

4. In a device of the class described, a cross-bar having slotted ends, side bars seated in said slots and having perforated ends, a pair of flexible runners extending through the perforated ends of the side bars, a seat-supporting bar connecting the free ends of the runners, and means for securing the latter in the perforations at the ends of the side bars.

In testimony that I claim the foregoing as my own I have hereto affixed my signature in the presence of two witnesses.

WILLIAM HENRY PAGE.

Witnesses:
D. G. ROBARTS,
R. H. HOWARD.